United States Patent [19]
Medsker et al.

[11] Patent Number: 6,084,031
[45] Date of Patent: Jul. 4, 2000

[54] TPV FROM HYDROSILYLATION CROSSLINKING OF ACRYLIC MODIFIED BROMO XP-50 BUTYL RUBBER

[75] Inventors: Robert E. Medsker, Hartville; Raman Patel; Donald Wang, both of Akron, all of Ohio

[73] Assignee: Advanced Elastomer Systems, L.P., Akron, Ohio

[21] Appl. No.: 09/201,050

[22] Filed: Nov. 30, 1998

[51] Int. Cl.[7] .............................. C08F 8/00; C08L 25/02
[52] U.S. Cl. .................... 525/192; 525/194; 525/195; 525/197; 525/241
[58] Field of Search ................... 525/192, 194, 525/195, 197, 241

[56] References Cited

U.S. PATENT DOCUMENTS

| | | |
|---|---|---|
| Re. 32,028 | 11/1985 | Fischer . |
| 2,671,774 | 3/1954 | McCracken et al. . |
| 2,823,218 | 2/1958 | Speier et al. . |
| 3,037,954 | 6/1962 | Gessler et al. . |
| 3,220,972 | 11/1965 | Lamoreaux . |
| 3,584,080 | 6/1971 | Walker et al. . |
| 4,046,930 | 9/1977 | Johnson et al. . |
| 4,130,534 | 12/1978 | Coran et al. . |
| 4,130,535 | 12/1978 | Coran et al. . |
| 4,578,497 | 3/1986 | Onopchenko et al. . |
| 4,803,244 | 2/1989 | Umpleby . |
| 4,831,081 | 5/1989 | King, III et al. . |
| 4,916,180 | 4/1990 | Robinson et al. . |
| 5,100,940 | 3/1992 | Wicher . |
| 5,100,947 | 3/1992 | Puydak et al. . |
| 5,157,081 | 10/1992 | Puydak et al. . |
| 5,240,983 | 8/1993 | Tabata et al. . |
| 5,384,369 | 1/1995 | Brosins et al. . |
| 5,416,147 | 5/1995 | Takarada et al. . |
| 5,597,867 | 1/1997 | Tsujimoto et al. . |
| 5,672,660 | 9/1997 | Medslcer et al. . |

FOREIGN PATENT DOCUMENTS

| | | |
|---|---|---|
| 0651009 | 5/1995 | European Pat. Off. . |
| 0855426 | 4/1997 | European Pat. Off. . |
| 6-212035 | 8/1994 | Japan . |
| 8-73682 | 3/1996 | Japan . |
| 1118327 | 7/1968 | United Kingdom . |

OTHER PUBLICATIONS

Functionalized PMS/IB copolymers offer a wider range of properties (A selective radical bromination process substitutes a bromine atom on the para–methyl group to convert the "base" copolymers into versatile functionalized copolymers) by Hscen C. Wang and Kenneth W. Powers in a reprint from *Elastomerics* Jan., 1 and Feb. 1, 1992, copyrighted to Communication Channels Inc., Atlanta, Georgia.

Functionalized PMS/IB copolymers off wide range of properties—Part II (Nucleophilic substitution reactions can convert benzyl bromides to specific functionalities and enable the preparation of graft copolymers) by Hsien C. Wang and Kenneth W. Powers in reprint from *Elastomerics*, Jan. 1 and Feb. 1, 1992 copyrighted to Communication Channels Inc., Atlanta, Georgia.

*Primary Examiner*—Nathan M. Nutter
*Attorney, Agent, or Firm*—Samuel B. Laferty; William A. Skinner

[57] ABSTRACT

An improved process for the preparation of thermoplastic vulcanizates from butyl rubbers by hydrosilylation crosslinking of acrylic or alkacrylic functionalized copolymers of isobutylene and paramethylstyrene is disclosed. The functionalization results in lower compression and tension set than when using conventional butyl rubbers. Other physical properties of the thermoplastic vulcanizate are improved consistent with more efficient crosslinking of the functionalized copolymer.

16 Claims, No Drawings

TPV FROM HYDROSILYLATION CROSSLINKING OF ACRYLIC MODIFIED BROMO XP-50 BUTYL RUBBER

FIELD OF THE INVENTION

This invention relates to thermoplastic vulcanizate compositions prepared using hydrosilylation crosslinking of the rubber component of the composition. A thermoplastic vulcanizate is generally defined as a polymer or blend of polymers that can be processed and recycled in the same way as a conventional thermoplastic material, yet has properties and functional performance similar to that of vulcanized rubber at service temperatures. Blends or alloys of plastic and rubber have become increasingly important in the production of high performance thermoplastic vulcanizates, particularly for the replacement of thermoset rubbers in various applications. The acrylic modification of the butyl rubber results in faster, more efficient crosslinking of butyl rubber with hydrosilylation crosslinking.

BACKGROUND OF THE INVENTION

Polymer blends which have a combination of both thermoplastic and elastic properties are generally obtained by combining a thermoplastic resin with an elastomeric composition in a way such that the elastomer component is intimately and uniformly dispersed as a discrete particulate phase within a continuous phase of the thermoplastic. Early work with vulcanized rubber components is found in U.S. Pat. No. 3,037,954 which discloses both static vulcanization of the rubber, as well as the technique of dynamic vulcanization wherein a vulcanizable elastomer is dispersed into a molten resinous thermoplastic polymer and the elastomer is cured while continuously mixing and shearing the blend. The resulting composition is a micro-gel dispersion of cured elastomer in an uncured matrix of thermoplastic polymer.

In U.S. Pat. No. Re. 32,028 polymer blends comprising an olefin thermoplastic resin and an olefin copolymer are described, wherein the rubber is dynamically vulcanized to a state of partial cure. The resulting compositions are reprocessible. U.S. Pat. Nos. 4,130,534 and 4,130,535 further disclose thermoplastic vulcanizates comprising butyl rubber and polyolefin resin, and olefin rubber and polyolefin resin, respectively. The compositions are prepared by dynamic vulcanization and the rubber component is cured to the extent that it is essentially insoluble in conventional solvents. A range of crosslinking, or curing, agents for the vulcanization of the rubber are described in the early art, including peroxides, sulfurs, phenolic resins, radiation, and the like.

U.S. Pat. No. 4,803,244 generally discusses the use of multifunctional organosilicon compounds in conjunction with a catalyst as an agent for crosslinking the rubber component of a thermoplastic elastomer by hydrosilylation. Hydrosilylation involves the addition of a silicon hydride across a multiple bond, often with a transition metal catalyst. This patent describes a rhodium catalyzed hydrosilylation of EPDM rubber in a blend with polypropylene.

A further modification of hydrosilylation crosslinking of the rubber in a thermoplastic elastomer composition is disclosed in European Patent Application No. 651,009. A compatibilizing agent containing in the same molecule a component having an affinity for the rubber and a component having an affinity for the thermoplastic resin is incorporated into the composition, and is said to improve adhesion between the rubber and resin in order to prevent agglomeration.

U.S. Pat. No. 5,672,660 generally describes thermoplastic elastomers prepared by hydrosilylation crosslinking of rubbers polymerized from monomers including specific dienes. The use of lower amounts of platinum catalysts was also described.

SUMMARY OF THE INVENTION

The present invention is based on the discovery that the process for hydrosilylation crosslinking of the rubber in a thermoplastic vulcanizate wherein the rubber is a copolymer of at least isobutylene and paramethylstyrene which was post polymerization functionalized with a carbon-carbon double bond from an acrylic or alkacrylic group. This combination provides rapid crosslinking of the rubber to a fully vulcanized state, yet requires an unexpectedly low concentration of the catalyst in order to achieve the cure. In the instant invention no compatibilizer is required in order to produce compositions with excellent mechanical properties, no bubble formation and very good colorability, due to the extremely low levels of catalyst concentration. Surprisingly, lower catalyst concentrations also produce compositions with much improved heat aging characteristics, resistance to degradation by ultraviolet light and having a non-hygroscopic character.

The compositions produced by the improved process have utility as replacements for thermoset rubber compounds in a variety of applications, particularly where molding or extrusion is involved and the combination of thermoplastic and elastomeric properties provides an advantage. Typical uses include molded articles for automobile underhood parts, engineering and construction materials, mechanical rubber goods, industrial parts such as hose, tubing and gaskets, electrical applications and household goods.

DESCRIPTION OF THE PREFERRED EMBODIMENTS

Thermoplastic vulcanizate compositions may generally be prepared by blending a thermoplastic resin and a rubber, then melting the thermoplastic component and mixing the melt until the blend is homogeneous. If a composition of vulcanized rubber in a thermoplastic matrix is desired, crosslinking agents (also referred to as curatives or vulcanizing agents) are added to the blend and crosslinking occurs during the mixing. This latter process is described as dynamic vulcanization.

A wide range of thermoplastic resins and rubbers and/or their mixtures have been used in the preparation of thermoplastic elastomers, including polypropylene, HDPE, LDPE, VLDPE, LLDPE, cyclic olefin homopolymers or copolymers as well as olefinic block copolymers, polystyrene, polyphenylene sulfide, polyphenylene oxide and ethylene propylene copolymer (EP) thermoplastics, with ethylene propylene diene rubber (EPDM), acrylonitrile butadiene rubber (NBR) and natural rubber (NR) as the elastomers. When the elastomer component is crosslinked, agents such as sulfur, peroxide, phenolics and ionic compounds are often used.

Hydrosilylation Agents

Hydrosilylation has also been disclosed as a crosslinking method. In this method a silicon hydride having at least two SiH groups in the molecule is reacted with the carbon-carbon multiple bonds of the unsaturated (i.e. containing at least one carbon-carbon double bond) rubber component of the thermoplastic elastomer, in the presence of the thermoplastic resin and a hydrosilylation catalyst. Silicon hydride compounds useful in the process of the invention include methylhydrogen polysiloxanes, methylhydrogen dimethylsiloxane copolymers, alkyl methyl polysiloxanes, bis(dimethylsilyl)alkanes and bis(dimethylsilyl)benzene.

Preferred silicon hydride compounds may be described by the formula

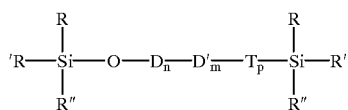
(1)

where each R is independently selected from the group consisting of alkyls comprising 1 to 20 carbon atoms, cycloalkyls comprising 4 to 12 carbon atoms and aryls. In formula (1) it is preferred that each R be independently selected from a group consisting of alkyls comprising 1 to 6 carbon atoms. Even more preferred is R=methyl. R' represents a hydrogen atom, an alkyl or alkoxy group having from 1 to about 24 carbon atoms. R" represents R or a hydrogen atom.

D represents the group

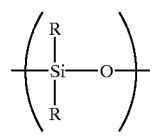

D' represents the group

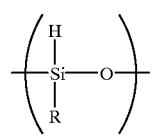

T represents the group F

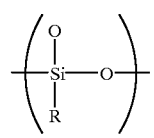

m is an integer having a value ranging from 1 to 50,
n is an integer having a value ranging from 1 to 50, and
p is an integer having a value ranging from 0 to 6.

Particularly preferred polyorganosiloxanes are those in which the silicon atom of the silicon hydride functionality is bound by heteroatoms/atoms having lone pairs of electrons. The preferred polyorganosiloxanes may also be substituted with appropriate functionality permitting solubility in the reaction media. A type of this functionalization is described in U.S. Pat. No. 4,046,930 which teaches alkylation of polyorganosiloxanes. Weight percent of alkylation should not exceed a level that does not permit adequate reaction rates due to steric constraints.

The amount of silicon hydride compound useful in the process of the present invention can range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic elastomer.

Thermoplastic Resins

Thermoplastic resins useful in the compositions produced by the invention include crystalline polyolefin homopolymers and copolymers. They are desirably prepared from monoolefin monomers having 2 to 20 carbon atoms, such as ethylene, propylene, 1-butene, 1-pentene and the like, as well as copolymers derived from linear and cyclic olefins, with propylene being preferred. As used in the specification and claims the term polypropylene includes homopolymers of propylene as well as reactor copolymers of polypropylene which can contain about 1 to about 20 wt % of ethylene or an—olefin comonomer of 4 to 20 carbon atoms, and mixtures thereof. The polypropylene can be crystalline, isotactic or syndiotactic polypropylene. Commercially available polyolefins may be used in the practice of the invention. Other thermoplastic resins which are substantially inert to the rubber, the silicon hydride and the hydrosilylation catalyst would also be suitable. Blends of thermoplastic resins may also be used.

The amount of thermoplastic resin found to provide useful compositions is generally from about 5 to about 90 weight percent, based on the weight of the rubber and resin. Preferably, the thermoplastic resin content will range from about 20 to about 80 percent by weight of the total polymer. This can also be expressed as a weight ratio of the thermoplastic resin to the rubber(s) of 5:95 to 90:10 more desirably 20:80 to 80:20.

Rubbers

Desirably the rubber is an acrylic or alkacrylic group functionalized (modified by adding the functional group) copolymer of at least isobutylene and paramethylstyrene. By the term acrylic or alkacrylic group, applicant means acrylic or aklacrylic or combinations thereof. The term alkacrylic is intended to express that the acrylic can have an alkyl or alkenyl substituent thereon of 1 to 5 carbon atoms, preferably methyl or ethyl. The functionalization reaction involves halogenating the copolymer of isobutylene and paramethyl styrene as set forth in EP publication no. 0 344 021 (preferably by bromination) and then reacting the brominated polymer with

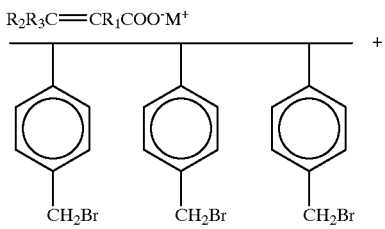

-continued forms

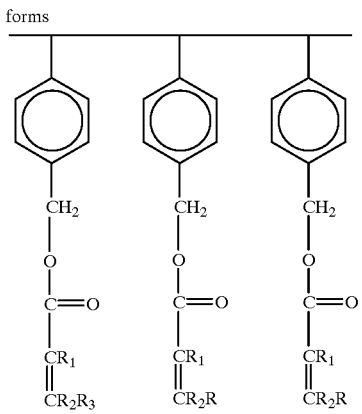

where $R_1$ and $R_2$ are H or an alkyl of 1 to 5 carbon atoms and $R_3$ is H, an alkyl or an alkenyl of 1 to 5 carbon atoms. The amount of acrylic or alkacrylic groups per polymer chain can vary depending on the properties desired. Desirably, the number of moles of acrylic or alkacrylic or combinations thereof, if both are present, is from about 0.1 to about 5 moles %, more desirably from about 0.3 to about 1.5 moles % based upon the total moles of repeat units.

Desirably, the copolymer of isobutylene and paramethylstyrene comprises repeat units from at least isobutylene and paramethylstyrene. Other copolymerizable monomers can be present in small amounts. The amount of repeating units from isobutylene is desirably from about 80 to about 99 weight percent, more desirably from about 90 to about 99 weight percent and the amount of repeat units from paramethylstyrene is from about 1 to about 20 weight percent and more desirably from about 1 to about 10 weight percent.

While a preferred embodiment is using the acrylic or alkacrylic group, or combinations thereof, functionalized copolymer of isobutylene and paramethylstyrene as the entire rubber component, it is possible to use a blend of said copolymer with the rubbers listed below. Desirably in a blend of the copolymer with other rubbers the copolymer is a majority by weight of the total rubbers in the thermoplastic vulcanizate.

Unsaturated rubbers useful to prepare thermoplastic vulcanizates include monoolefin copolymer rubbers comprising non-polar, rubbery copolymers of two or more -monoolefins, preferably copolymerized with at least one polyene, usually a diene. However, unsaturated monoolefin rubber such as EPDM rubber is more suitable. EPDM is a polymer of ethylene, propylene and one or more non-conjugated diene or non-conjugated dienes, and the monomer components may be polymerized using Ziegler-Natta or metallocene catalyzed reactions, among others. Satisfactory non-conjugated dienes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB) and the like, or a combination thereof.

It has been found that rubber having a structure in which the diene monomer has carbon-carbon multiple bonds which are predominately unencumbered, i.e. bonds which are sterically unhindered such as terminal or pendant double bonds, provide a greatly improved rate of cure in the hydrosilylation curing process of the invention. Structures in which the bonds either normally are unencumbered or are easily isomerized to form a sterically unencumbered double bond, are rapidly hydrosilated, e.g. 1,4-hexadiene or ENB. This use of sterically unhindered carbon-carbon multiple bonds is particularly beneficial where a fully cured rubber component is desired. The use of an additional rubber in which the diene component is selected from the group consisting of 5-ethylidene-2-norbornene, 5-methyl-1,4-hexadiene, 1,4-hexadiene and 5-vinyl-2-norbornene is preferred. 5-vinyl-2-norbornene is particularly preferred as a diene component of such rubber.

Butyl rubbers are also useful as additional rubbers in the compositions of the invention. As used in the specification and claims, the term "butyl rubber" includes copolymers of an isoolefin and a conjugated monoolefin, terpolymers of an isooolefin, a conjugated monoolefin and divinyl aromatic monomers, and the halogenated derivatives of such copolymers and terpolymers. The useful butyl rubber copolymers comprise a major portion of isoolefin and a minor amount, usually less than 30 wt %, of a conjugated multiolefin. The preferred copolymers comprise about 85–99.5 wt % of a $C_{4-7}$ isoolefin such as isobutylene and about 15–0.5 wt % of a multiolefin of 4–14 carbon atoms, such as isoprene, butadiene, dimethyl butadiene, 4-methyl-1,4-pentadiene and piperylene. Commercial butyl rubber, useful in the invention, is a copolymer of isobutylene and minor amounts of isoprene. Other butyl co- and terpolymer rubbers are illustrated by the description in U.S. Pat. No. 4,916,180. Isobutylene/divinylbenzene is particularly preferred as an elastomer suitable for hydrosilylation crosslinking.

A further rubber suitable in the invention is natural rubber. The main constituent of natural rubber is the linear polymer cis-1,4-polyisoprene. It is normally commercially available in the form of smoked sheets and crepe. Synthetic polyisoprene can also be used with the particularly preferred synthetic polyisoprene elastomers being those that contain vinyl functionality pendant to the main polymer chain, i.e. 1,2-enchainments.

Polybutadiene is also a suitable elastomer for hydrosilylation curing with polybutadienes that contain vinyl functionality being the most preferred.

In preparing the compositions of the invention, the amount of rubber generally ranges from about 95 to about 10 weight percent, based on the weight of the rubber and thermoplastic resin. Preferably, the rubber content will be in the range of from about 80 to about 20 weight percent of total polymer.

Hydrosilylation Catalysts

It has previously been understood that any catalyst, or catalyst precursor capable of generating a catalyst in situ, which will catalyze the hydrosilylation reaction with the carbon-carbon bonds of the rubber can be used. Such catalysts have included transition metals of Group VIII such as palladium, rhodium, platinum and the like, including complexes of these metals. Chloroplatinic acid has been disclosed as a useful catalyst in U.S. Pat. No. 4,803,244 and European Application No. 651,009, which further disclose that the catalyst may be used at concentrations of 5 to 10,000 parts per million by weight and 100 to 200,000 parts per million by weight based on the weight of rubber, respectively.

It has been found in the process of the present invention that significantly lower concentrations of platinum-containing catalyst can be used, while obtaining improvement in both the speed of the reaction and the efficiency of the crosslinking. Concentrations of catalyst in the range of about 0.1 to about 10, 20, or 40 parts per million by weight, expressed as platinum metal, are effective in rapidly and completely curing the rubber in the process of dynamically vulcanizing blends of thermoplastic resin and rubber. These low catalyst concentrations are particularly effective in combination with acrylic or alkacrylic or combinations thereof functionalized copolymer of isobutylene and param-ethyl styrene having carbon-carbon multiple bonds which are predominately sterically unhindered Catalyst concentrations of about 1 to about 25 parts per million by weight based on the weight of rubber, expressed as platinum metal, are particularly preferred.

Platinum-containing catalysts which are useful in the process of the invention are described, for example, in U.S. Pat. No. 4,578,497; U.S. Pat. No. 3,220,972; and U.S. Pat. No. 2,823,218 all of which are incorporated herein by this reference. These catalysts include chloroplatinic acid, chloroplatinic acid hexahydrate, complexes of chloroplatinic acid with sym-divinyltetramethyldisiloxane, dichloro-bis (triphenylphosphine) platinum (II), cis-dichloro-bis (acetonitrile) platinum (II), dicarbonyldichloroplatinum (II), platinum chloride and platinum oxide. Zero valent platinum metal complexes such as Karstedt's catalyst are particularly preferred, as described in U.S. Pat. No. 3,775,452; U.S. Pat. No. 3,814,730; and U.S. Pat. No. 4,288,345 all of which are incorporated herein by this reference.

In order for the catalyst to function most efficiently in the dynamic vulcanization environment, it is important that it is inherently thermally stable, or that its activity is inhibited to prevent too rapid a reaction or catalyst decomposition. Appropriate catalyst inhibitors that are suitable to stabilize the platinum catalyst at high temperatures include 1,3,5,7-tetravinyl-1,3,5,7-tetramethylcyclotetrasiloxane and its higher analogs such as methylvinyl cyclic pentamer. However, other olefins that provide stable, yet catalytically active platinum metal complexes include maleates, fumarates, and substituted alkynes. It is also particularly preferred in the invention to use a catalyst that remains soluble in the reaction medium.

Additives

The thermoplastic elastomer may contain conventional additives, which can be introduced into the composition in the thermoplastic resin, the rubber, or in the blend either before, during or after the hydrosilylation and curing. Examples of such additives are antioxidants, processing aids, reinforcing and nonreinforcing fillers, pigments, waxes, rubber processing oil, extender oils, antiblocking agents, antistatic agents, ultraviolet stabilizers, plasticizers (including esters), foaming agents, flame retardants and other processing aids known to the rubber compounding art. Such additives may comprise from about 0.1 to about 300 percent by weight based on the weight of the final thermoplastic elastomer product. Fillers and extenders which can be utilized include conventional inorganics such as calcium carbonate, clays, silica, talc, titanium dioxide, carbon black and the like. Additives, fillers or other compounds which may interfere with the hydrosilylation should be added after curing reaches the desired level.

In another embodiment, it has been found that the heat aging properties of compositions prepared according to the invention can be greatly improved by the addition of a metal chelating agent to the blend. This effect is believed to be due to the fact that the hydrosilylation catalyst is in an active valence state. This form of the platinum metal accelerates degradation of the thermoplastic elastomer, particularly under conditions of elevated temperature over an extended time. Chelation prevents the metal from causing degradation.

Typical chelating agents useful for this purpose include materials such as 1,2-bis(3,5-di-ter-butyl-4-hydroxyhydrocinnamoyl)hydrazine and the like. Surprisingly, these agents may be incorporated into the composition prior to or after the hydrosilylation curing. Amounts of chelating agent ranging from about 0.025 parts per hundred parts of rubber (phr) to about 10 phr have been found to be useful, and amounts in the range of about 0.1 phr to 2 phr are preferred.

In a further embodiment of the invention, it has been demonstrated that reducing residual or unreacted silicon hydride functionality in the thermoplastic elastomer products results in compositions which have improved heat stability. Unreacted silicon hydride may be reduced or eliminated by reacting the silicon hydride with compounds containing active hydrogen, carbon-carbon multiple bonds, carbon-oxygen double bonds or carbon-nitrogen double bonds and the like. The residual silicon hydride reacts with these compounds to eliminate silicon hydride functionality and form silicon-oxygen or carbon-silicon bonds.

Typical compounds useful for this purpose are silica and water. These agents are incorporated into the composition after the hydrosilylation cure is complete. Water may be introduced as steam anytime after cure in a single or two pass operation. Amounts of such compounds may be estimated by measuring residual silicon hydride and adding a stoichiometric amount of the compound. One may also desire to add a stoichiometric excess if necessary to eliminate a sufficient amount of the residual silicon hydride in order to realize the desired improvement in heat aging properties. Amounts of such compounds ranging from about one mole equivalent to about 10 mole equivalents have been found to be useful, and amounts in the range of about 1 to 3 mole equivalents are preferred.

Extender Oil

The rubber processing or extender oils used in thermoplastic elastomers generally are paraffinic, naphthenic or aromatic oils derived from petroleum fractions. The type will be that ordinarily used in conjunction with the specific rubber or rubbers present in the composition, and the quantity based on the total rubber content of the thermoplastic elastomer may range from zero to several hundred parts per hundred rubber. Important to the efficiency of the catalyst is that the oils and other additives contain no or very low concentrations of compounds that are catalyst inhibitors or that interfere with the activity of the catalyst. These compounds include phosphines, amines, sulfides, thiols or other compounds that may be classified as Lewis bases. Lewis bases, or other compounds that have a pair of electrons available for donation, will react with the platinum catalyst, effectively neutralizing its activity. It has been discovered that the presence of such compounds has a surprisingly detrimental impact on hydrosilylation curing in the process of dynamic vulcanization of the rubber component of the thermoplastic elastomer compositions. If the concentration of compounds which have the chemical reactivity of Lewis bases, such as compounds containing sulfur or nitrogen, is maintained at or below a level which provides less than about 1000 ppm and 300 ppm of sulfur and nitrogen respectively, then the amount of platinum catalyst required to promote efficient hydrosilylation curing in dynamic vulcanization can be substantially reduced, usually to the range of about 4 ppm or less, without impact on the cure state of the rubber or the tensile properties of the thermoplastic elastomer product. Concentrations of sulfur and nitrogen below about 500 and 200 ppm respectively are more preferred, and concentrations of less than about 30 ppm sulfur and less than about 100 ppm nitrogen are most preferred. It has been discovered that, even at catalyst concentrations as low as 0.25 ppm, full cure of the elastomer can be achieved if the concentration of sulfur and nitrogen is within the most preferred ranges.

Most paraffinic petroleum oils for the rubber industry are derived from a crude oil distillation stream. A typical refining history would include some type of dewaxing to reduce the pour point, a solvent extraction to physically remove aromatic compounds and a hydrotreating process to chemically modify aromatic structures. Both extraction and hydrotreating result in a net increase in the total concentration of saturated hydrocarbon structures and a net decrease in the total aromatic, sulfur and nitrogen-containing compound concentration. The degree of reduction in concentration of these compounds in the oil is dependent upon the type and severity of the refining employed, and the nature of the crude oil. White and paraffinic oils have been treated more extensively than aromatic and napthenic oils and would contain a smaller concentration of aromatic, sulfur and/or nitrogen compounds. It is difficult to elucidate the exact chemical structure of these compounds due to their complexity. The tendency of an oil to interfere with platinum catalyzed hydrosilylation is directly related to the concentration of sulfur and nitrogen containing compounds, as well as compounds which contain phosphorus, tin, arsenic, aluminum and iron.

Processing

The rubber component of the thermoplastic elastomer is generally present as small, i.e. micro-size, particles within a continuous thermoplastic resin matrix, although a co-continuous morphology or a phase inversion is also possible depending upon the amount of rubber relative to plastic and the degree of cure of the rubber. The rubber is desirably at least partially crosslinked, and preferably is completely or fully crosslinked. It is preferred that the rubber be crosslinked by the process of dynamic vulcanization. As used in the specification and claims, the term "dynamic vulcanization" means a vulcanization or curing process for a rubber blended with a thermoplastic resin, wherein the rubber is vulcanized under conditions of shear at a temperature at which the mixture will flow. The rubber is thus simultaneously crosslinked and dispersed as fine particles within the thermoplastic resin matrix, although as noted above other morphologies may exist. Dynamic vulcanization is effected by mixing the thermoplastic elastomer components at elevated temperatures in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

The terms "fully vulcanized" and "fully cured" or "fully crosslinked" as used in the specification and claims means that the rubber component to be vulcanized has been cured or crosslinked to a state in which the elastomeric properties of the crosslinked rubber are similar to those of the rubber in its conventional vulcanized state, apart from the thermoplastic elastomer composition. The degree of cure can be described in terms of gel content, or conversely, extractable components. Gel content reported as percent gel (based on the weight of crosslinkable rubber) is determined by a procedure which comprises determining the amount of insoluble polymer by soaking the specimen for 48 hours in organic solvent at room temperature, weighing the dried residue and making suitable corrections based upon knowledge of the composition. Thus, corrected initial and final weights are obtained by subtracting from the initial weight the weight of soluble components, other than rubber to be vulcanized, such as extender oils, plasticizers and components of the composition soluble in organic solvent, as well as that rubber component of the product which is not intended to be cured. Any insoluble polyolefins, pigments, fillers, and the like are subtracted from both the initial and final weights. The rubber component can be described as fully cured when less than about 5%, and preferably less than 3%, of the rubber which is capable of being cured by hydrosilylation is extractable from the thermoplastic elastomer product by a solvent for that rubber. Alternatively the degree of cure may be expressed in terms of crosslink density. All of these descriptions are well known in the art, for example in U.S. Pat. Nos. 4,593,062, 5,100,947 and 5,157,081, all of which are fully incorporated herein by this reference.

The following general procedure was used in the preparation of thermoplastic elastomers by the process of the invention, as set forth in the examples. The thermoplastic resin, oil and rubber were placed in a heated internal mixer, with the hydrosilylation agent and hydrosilylation catalyst. The hydrosilylation agent and catalyst can be incorporated into the composition by any suitable technique, for example by injection as solutions in oil or as neat components, although a dilute hydrosilylation crosslinker and catalyst solutions are preferred. Additives such as antioxidants, ultraviolet stabilizers and fillers may also be added as a slurry in oil. Masterbatches of the components may also be prepared to facilitate the blending process. The mixture was heated to a temperature sufficient to melt the thermoplastic component, and the mixture was masticated, with added processing oil if desired, until a maximum in the mixing torque indicated that vulcanization had occurred. Mixing was continued until the desired degree of vulcanization was achieved.

The order of addition of the hydrosilylation agent and hydrosilylation catalyst was found to be important. Maximum catalyst efficiency was obtained when the hydrosilylation agent was added first to the blend, followed by the hydrosilylation catalyst. The mechanical properties of the thermoplastic elastomer products, as well as the degree of cure, were improved when this order of addition was followed.

The invention will be better understood by reference to the following examples which serve to illustrate but not limit the present process. In the examples, the following test methods were used to determine the properties of the thermoplastic elastomer products.

| | |
|---|---|
| Hardness (Shore A) | ASTM D 2240 |
| Ultimate tensile strength (UTS - psi) | ASTM D 412 |
| Ultimate elongation (UE - %) | ASTM D 412 |
| Modulus at 100% elongation (M100 - psi) | ASTM D 412 |

-continued

| | |
|---|---|
| Tear Strength pli | ASTM D 412 |
| Tension set (TS - %) | ASTM D 412 |
| Compression Set | ASTM D 395, Method B |

The components used in the compositions prepared according to the examples are further identified as follows.

| | |
|---|---|
| Copolymer A | Methacrylate grafted XP-50 Butyl Rubber (0.35 mole methacrylic groups) |
| Copolymer B | Methacrylate grafted XP-50 Butyl Rubber (0.51 mole methacrylic groups) |
| Copolymer C | Methacrylate grafted XP-50 Butyl Rubber (0.73 mole methacrylic groups) |
| Butyl Rubber B | Butyl 268 from Exxon |
| Polypropylene A | Homopolypropylene MFI = 2600(LMW) |
| Polypropylene B | Copolymer of propylene and ethylene MFI = 4 |
| Polypropylene C | Homopolypropylene MFI = 14 |
| Si-H "A" | 2-2822 from Dow Corning hydrosilylation crosslinker |
| Catalyst A | PC-085 1.0 wt % in paraffinic oil from Dow Corning (platinum containing catalyst) |
| Oil (paraffinic) A | Britol 20T mineral oil from Witco |
| Oil (polybutene) B | Exxon Parapol 950 |
| Oil (polybutene) C | Exxon Parapol 450 |

EXAMPLE 1

Compositions Ia, Ib, Ic, and Id were prepared to compare the properties of thermoplastic vulcanizates from methacrylate functionalized copolymers of isobutylene and paramethylstyrene (Copolymer A) to the controls from thermoplastic vulcanizates from conventional butyl rubber, Compositions IIc and IId (using Butyl rubber B, a copolymer of isobutylene and a conventional diene for butyl rubber). Compositions Ia through Id using the methacrylate functionalized copolymers had higher UE, M-100, and Tear Strength and lower Tension Set and Compression Set than the control examples IIc and IId. It was generally observed that the Butyl Rubber "B" did not cure under the reaction conditions. Compositions Ia–Id vary. Composition Ia used 2.84 wt % Si—H "A", 4.74 wt % Catalyst "A" and 23.7 wt % Oil "A" while Ib uses the same amounts but substitutes Oil "B" (a polybutene oil) for an Oil "A" (a mineral oil). Composition Ic varies from the first two compositions in that it uses only 1.48 wt % Si—H "A", 2.46 wt % Catalyst "A" and uses the Oil "B" (polybutene similar to Composition Ib). Composition Id uses the lower amounts of Si—H and Catalyst (similar to composition Ic) and then substitutes Oil "C" (a polybutene oil). The properties of the thermoplastic vulcanizates did not change much going from Composition Ia to Composition Ib indicating the oil type had little effect other than possibly matching the refractive index of the rubber and plastic phases. The properties only changed slightly going to Composition Ic and Composition Id indicating that smaller amounts of hydrosilylation agent (Si—H) and catalyst are nearly as effective as higher amounts of the same components. The physical properties of the two control (Compositions IIc and IId) indicate that complete curing of the conventional butyl rubber does not occur even when nearly twice as much hydrosilylation agent and catalyst are used as compared to the lowest levels used to cure a methacrylate functionalized copolymer of isobutylene and paramethylstyrene. The properties of the two controls (especially the compression set and tension set) are generally unsuitable for most thermoplastic vulcanizate applications.

TABLE 1

HYDROSILYLATION CURED THERMOPLASTIC VULCANIZATES

| Composition Ingredients | Ia Wt % | Ib Wt % | Ic Wt % | IIc Wt % | Id Wt % | IId Wt % |
|---|---|---|---|---|---|---|
| Copolymer A | 47.39 | 47.39 | 49.26 | | 49.26 | |
| Butyl Rubber | | | | 49.26 | | 47.39 |
| Polypropylene A | 2.37 | 2.37 | | | | |
| Polypropylene B | 9.48 | 9.48 | 12.32 | 12.32 | 12.32 | 11.85 |
| Polypropylene C | 9.48 | 9.48 | 9.85 | 9.85 | 9.85 | 9.48 |
| Si-H A | 2.84 | 2.84 | 1.48 | 1.48 | 1.48 | 2.84 |
| Catalyst A | 4.74 | 4.74 | 2.46 | 2.46 | 2.46 | 4.74 |
| Oil (paraffinic) A | 23.70 | | | | | |
| Oil (polybutene) B | | 23.70 | 24.63 | 24.63 | | |
| Oil (polybutene) C | | | | | 24.63 | 23.70 |
| TOTAL | 100 | 100 | 100 | 100 | 100 | 100 |
| ROOM TEMPERATURE PROPERTY | | | | | | |
| Hardness A, 5 sec | 55 | 55 | 53 | 36 | 52 | 30 |
| UE, % | 279 | 277 | 386 | 737 | 375 | 124 |
| UTS, psi | 698 | 660 | 695 | 128 | 589 | 112 |
| M-100, psi | 310 | 324 | 284 | 122 | 248 | 112 |
| Tear Strength, pli | 112 | 145 | 137 | 50 | 102 | 39 |
| Tension Set, % | 6 | 8 | 10 | 35 | 10 | 55 |
| Comp. Set, 22 hrs, 70C | 24 | 25 | 32 | 81 | 34 | 100 |

TABLE 2

ORGANOSILOXANE CURED ACRYLIC MODIFIED Br-XP-50 BUTYL TPV

| Composition Ingredients | IIIa Wt % | Ie Wt % | IVa Wt % | Va Wt % | VIa Wt % |
|---|---|---|---|---|---|
| Copolymer A | | 56.09 | | | 60.00 |
| Copolymer B | 55.00 | | | 60.00 | |
| Copolymer C | | | 57.64 | | |
| Polypropylene MFI = 0.7 | 36.67 | 37.40 | 38.43 | 40.00 | 40.00 |
| SiH A | 1.67 | 1.73 | 1.78 | | |
| Catalyst A | 6.67 | 4.78 | 2.15 | | |
| TOTAL | 100.00 | 100.00 | 100.00 | 100.00 | 100.00 |
| Hardness A, 5 sec | 92 | 88 | 87 | 86 | 87 |
| ROOM TEMPERATURE PROPERTY | | | | | |
| UE, % | 420 | 340 | 170 | 170 | 220 |
| UTS, psi | 2900 | 1960 | 1220 | 1020 | 730 |
| | 698 | 660 | | | |
| | 695 | 128 | | | |
| | 589 | 112 | | | |
| M-100, psi | 1400 | 1190 | 1100 | 990 | 720 |
| M-300, psi | 2300 | 1770 | | | |
| Tension Set, % | 24 | 25 | 34 | Break | 78 |
| Comp. Set, 22 hrs, 100° C. | 47 | | | | |
| Gel % | 97 | 88 | 85 | 23 | 8 |

The examples in Table 2 further illustrate the desirability of crosslinking acrylic or methacrylic functionality on an isobutylene-p-methylstyrene copolymer. None of the compositions of Table 2 include oil so they have higher Shore A hardness. Composition IIIa is derived from a copolymer with a higher amount of methacrylic functionality (0.51 mole %) than previous examples. Composition Ie is similar to previous compositions but has no oil. Composition IVa is similar to earlier compositions but uses a copolymer with 0.73 mole % methacrylic functionality. Composition Va (control) is similar to IIIa but lacks silicon hydride crosslinker and catalyst. Composition VIa (control) is similar to Ie but lacks silicon hydride crosslinker and a catalyst.

While the best mode and preferred embodiment of the invention have been set forth in accord with the Patent Statutes, the scope of the invention is not limited thereto, but rather is defined by the attached claims.

What is claimed is:

1. A thermoplastic vulcanizate comprising:
   a) a thermoplastic resin and
   b) a butyl rubber copolymer of isobutylene and paramethylstyrene containing acrylic and/or alkacrylic groups pendant on repeat units from paramethylstyrene via a carboxyl linkage to the paramethyl group, said butyl rubber copolymer being crosslinked via the reaction product of a hydrosilylation crosslinking agent and a carbon-carbon double bond of said acrylic and/or alkacrylic groups.

2. A thermoplastic vulcanizate according to claim 1, wherein said butyl rubber is the reaction product of acrylate modification of a brominated copolymer of at least isobutylene and paramethylstyrene.

3. A thermoplastic vulcanizate according to claim 2, wherein said alkacrylic group is derived from metal salt of acrylic or methacrylic acid.

4. A thermoplastic vulcanizate according to claim 2, wherein said butyl rubber less said acrylic and/or alkacrylic group is a copolymer of from about 80 to about 99 weight percent isobutylene and from about 1 to about 20 weight percent paramethylstyrene.

5. A thermoplastic vulcanizate according to claim 2, wherein said copolymer includes from about 0.1 to about 5 mole % acrylic or alkacrylic group or a combination thereof if both of them are present.

6. A thermoplastic vulcanizate according to claim 2, wherein said thermoplastic resin and said butyl rubber are present in ratios by weight of from about 20:80 to about 80:20.

7. A thermoplastic vulcanizate according to claim 6, wherein said butyl rubber copolymer comprises from about 80 to about 99 weight percent repeat units from isobutylene and from about 1 to about 20 weight percent repeat units from paramethylstyrene and from about 0.1 to about 5 mole % acrylic or alkacrylic groups.

8. A thermoplastic vulcanizate according to claim 7, wherein said thermoplastic resin comprises polyethylene or polypropylene.

9. A thermoplastic vulcanizate according to claim 8 further including residual platinum from a platinum containing hydrosilylation catalyst.

10. A process for forming a thermoplastic vulcanizate, said process comprising:
    a) blending
       1) a thermoplastic resin
       2) a butyl rubber copolymer of isobutylene and paramethylstyrene having acrylic or alkacrylic groups, or combinations thereof pendant from at least some of the repeat units from paramethylstyrene via a carboxyl linkage from the acrylic or alkacrylic group,
       3) a hydrosilylation crosslinking agent and,
       4) a catalyst for hydrosilylation crosslinking,
    b) crosslinking said butyl rubber copolymer with said hydrosilylation crosslinking agent.

11. A process according to claim 10, wherein the weight ratio of thermoplastic resin to butyl rubber copolymer is from about 20:80 to about 80:20 respectively.

12. A process according to claim 11, wherein said thermoplastic resin comprises polyethylene or polypropylene.

13. A process according to claim 12, wherein said acrylic or alkacrylic, or combinations thereof comprise acrylic, methacrylic, or ethacrylic or combinations thereof.

14. A process according to claim 12, wherein said catalyst comprises platinum containing catalyst.

15. A process according to claim 12, wherein said copolymer of isobutylene and paramethylstyrene comprises from about 80 to about 99 weight percent isobutylene, and from 1 to about 20 weight percent paramethylstyrene.

16. A process according to claim 12, wherein said acrylic or alkacrylic groups or combinations thereof, if both are present, are present in an amount from about 0.1 to about 5 mole %.

* * * * *